June 10, 1924.

C. F. TRUSLER

AUTOMOBILE JACK

Filed July 9, 1923

Inventor
Charles F. Trusler

June 10, 1924.

C. F. TRUSLER

AUTOMOBILE JACK

Filed July 9, 1923

Inventor

Chas. F. Trusler

Patented June 10, 1924.

1,497,046

UNITED STATES PATENT OFFICE.

CHARLES F. TRUSLER, OF CHEBANSE, ILLINOIS.

AUTOMOBILE JACK.

Application filed July 9, 1923. Serial No. 650,386.

*To all whom it may concern:*

Be it known that I, CHARLES F. TRUSLER, a citizen of the United States, residing at Chebanse, in the county of Iroquois and State of Illinois, have invented certain new and useful Improvements in an Automobile Jack, of which the following is a specification.

This invention relates to improvements in automobile jacks and has for its prime object to provide a jack whereby the front or rear end of an automobile can be elevated to any desired height, so that a mechanic can work under the automobile in a kneeling or standing position.

A further object of my invention is to provide a jack whereby the body of an automobile can be easily and readily removed from the running gear, so that the axles and drive shafts can be readily removed for the purpose of repair or replacing with new ones.

A still further object of my invention is to provide a jack comprising a series of shafts and bevel-gears, whereby a car of any weight can be easily raised and lowered with little effort on the part of the operator of the jack.

And a still further object of my invention is to provide an automobile jack, whereby the weight of the automobile will automatically lock the jack in position at any desired height.

Another object of my invention is to provide a jack capable of performing the above indicated objects, which is simple in construction, durable efficient for the purpose intended, and one that can be manufactered and installed in all garages at a relatively low cost.

These and like objects of the invention will be better understood as the description follows and as is specifically pointed out in the appended claims.

Referring to the accompanying drawings which form a part of this specification and which clearly illustrate the construction and operation of my invention.

Referring to the accompanying drawings in detail, like characters will be used to designate like parts in the different views.

Figure 1:
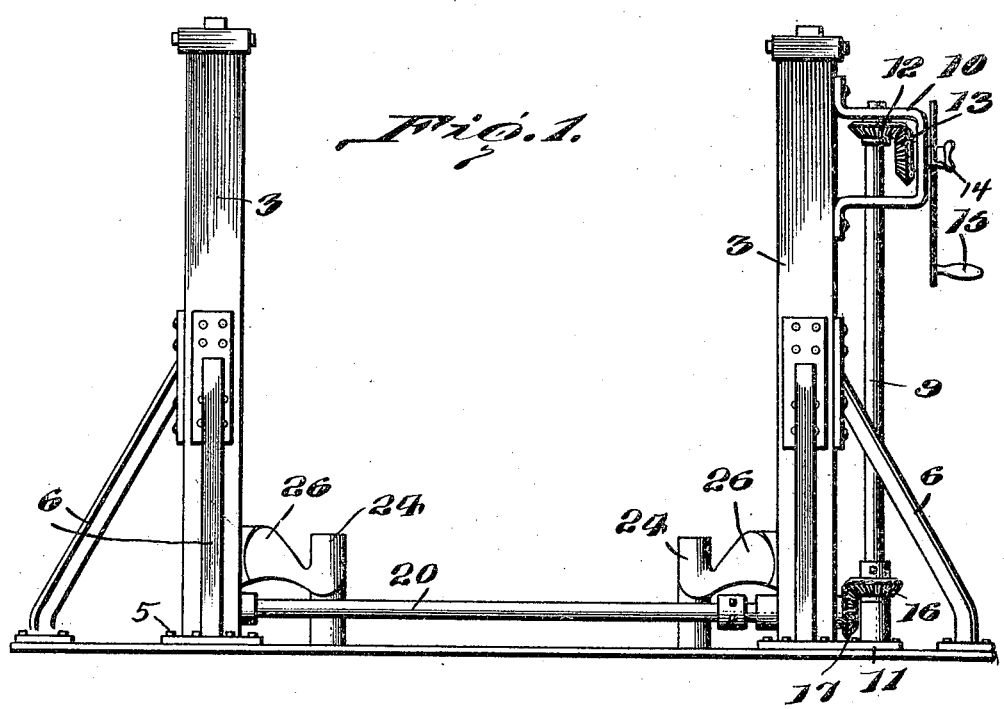
Figure 1 is a side elevation of a jack constructed in accordance with my invention.
Figure 2:
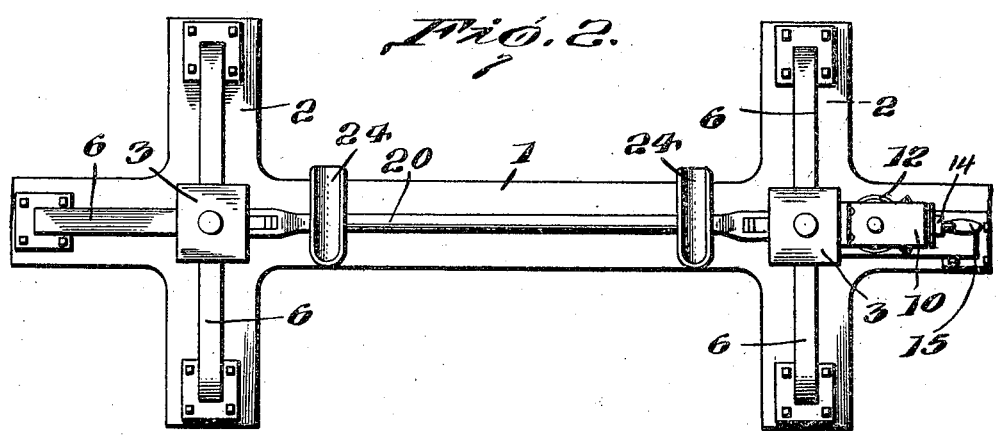
Figure 2 is a top plan view of same.

In the drawings, the numeral 1 indicates the platform of my inproved jack. Each end of the platform 1 is provided with a T-head as at 2, as to provide a brace for the base to prevent turning of same when the weight of an automobile is placed thereon at an incline of 45 degrees.

Mounted on the platform 1 at opposite ends at the intersection of the cross braces 2 is a hollow post 3, which is provided with a slot 4 extending approximately full height of same on its inner side. The purpose of the slot 4 will be better understood as the description follows. The post 3 is secured to the platform 1 by bolts 5 or any other suitable fastening means, so that same can be easily removed from the base in case repairs are desired thereto Braces 6 are attached to the outer ends of the platform 1 and the outer ends of the cross members 2, and the free ends of the braces are attached to the posts 3 intermediate the ends of same, as is clearly shown in Figure 1.

Figure 3:
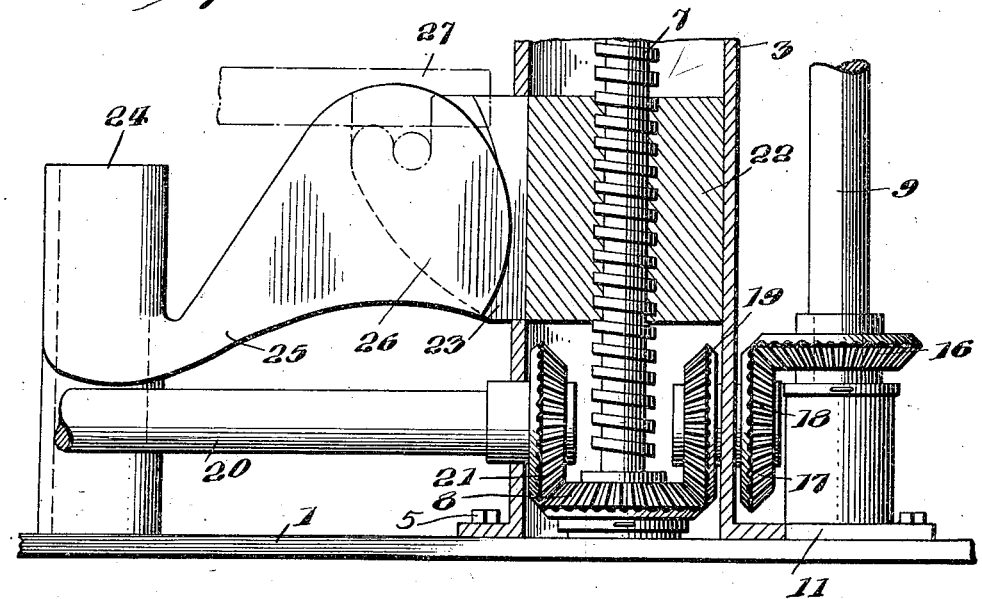
Figure 3 is a vertical section taken partly on line 3—3 of Figure 4.
Figure 4:
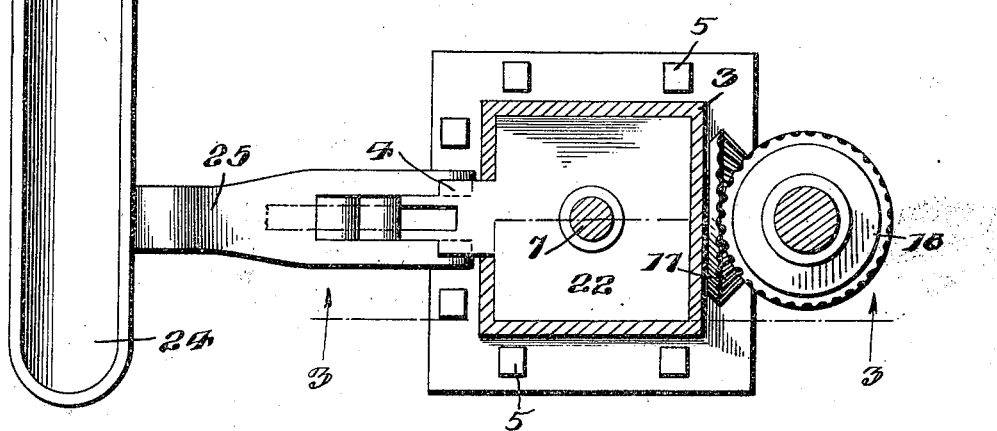
Figure 4 is an enlarged detail sectional view to better illustrate the operating means embodied in one of the post jacks.

A screw shaft 7 is positioned in each of the posts 3 and a bevel gear 8 is keyed to the lower end of the screw shaft 7, as is clearly indicated in Figure 3 of the accompanying drawing. A shaft 9 is positioned in bearings 10 and 11 on the outside of one of the posts 3 and has keyed to the upper end of same a bevel-gear 12, which meshes with a bevel-gear 13 on a shaft 14 to which is attached an operating handle 15. A bevel-gear 16 is keyed to the lower end of the shaft 9 and meshes with a bevel-gear 17 on the end of a shaft 18 that extends through one side wall of one of the posts 3. A bevel-gear 19 is mounted on the opposite end of the shaft 18 within the post 3 and is adapted to mesh with the bevel-gear 8 on the lower end of the screw shaft 7.

A shaft 20 is supported in the posts 3 and a bevel-gear 21 is keyed to each end of the shaft. The bevel-gears 21 are adapted to mesh with the gears 8.

A block 22 having a central worm passage is positioned in each of the posts 3 and is provided with a projection 23 that projects through the opening 4 and the extreme end of the projection is provided with a slot, as is clearly indicated by dotted lines in Figure 3.

A stirrup or wheel receiving device 24 is positioned over the shaft 20 and supported on an inclined position by means of an arm 25 formed integral with the underside of same. The arm 25 terminates into an enlarged portion 26 which is provided with a pin extending transversely therethrough and when the stirrup or wheel receiving devices 24 are placed in position, the pin as shown by dotted lines in Figure 3 engages the slot in the end of the projection 23.

The extension 23 is also provided with a recess in the upper face of same for receiving therein a cross bar 27 which can be used to remove the body of an automobile when not using the stirrups or wheel receiving means 24.

From the foregoing description of my invention taken in connection with the accompanying drawings, it can be readily seen that as the shaft 9 is rotated by means of the crank or handle 15, rotation is imparted through the screw shaft 7 to the various bevel-gears, which elevates the block 22 within each of the posts 2, which in turn elevates the arm and wheel receiving device 24 to which the front or rear wheels of an automobile have been secured in position.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In an automobile jack, comprising a platform, a pair of upright posts mounted upon the platform, a screw shaft journaled in each of the posts, an internally threaded block adapted to be raised and lowered by the said screw shaft, extension lug formed on the movable block, stubs or wheel engaging segments having curved extension arms formed at right angle thereto, pins positioned within grooves formed in the curved arms, the said pins being adapted to engage the extension formed on the movable block, a shaft secured to the outerside of one of the posts, bracket means for retaining the shaft in position against the posts, a plurality of toothed gears mounted upon the said shaft, a gear adapted to mesh with the toothed gear secured to the upper portion of the shaft, a handle secured to the said gear, a plurality of gears secured to the screw shaft, means for rotating the said screw shaft by means of the said handle, and means for bracing the posts.

2. In an automobile jack, comprising a platform having cross members formed thereon for bracing the same, a pair of hollow posts secured to the platform, means for bracing the posts upon the platform, a screw jack journaled in the center of the said posts, a vertical shaft positioned adjacent one of the posts, a bracket secured to the post and having the vertical shaft journaled therein, gears formed on the upper and lower extremity of the said vertical shaft, a handle shaft secured to the bracket at right angle to the vertical shaft, a toothed gear mounted on the handle shaft and adapted to mesh with the upper gear upon the vertical shaft, an operating handle mounted upon the said handle shaft, gears mounted upon the screw shaft within the posts, means for connecting the screw shaft gears with the vertical shaft in order that they may be rotated thereby, internally threaded blocks positioned within the posts and adapted to engage the threads formed on the screw shaft, extension lugs formed on the movable blocks, treads or wheel engaging segments having angular arms secured thereto, and means for connecting the treads or wheel segments upon the extension lugs formed upon the movable blocks.

In testimony whereof, I have affixed my signature in the presence of two witnesses.

CHARLES F. TRUSLER.

Witnesses:
S. P. THOMAS,
C. L. THOMPSON.